United States Patent Office 2,975,833
Patented Mar. 21, 1961

2,975,833

APPARATUS FOR MANUFACTURING SHEETS OF FIBROUS MATERIALS

Alessandro Magnani, 18 Viale della Liberta, Pavia, Italy

Filed June 5, 1959, Ser. No. 818,359

Claims priority, application Italy June 6, 1958

3 Claims. (Cl. 162—318)

This invention relates to an apparatus for manufacturing sheets of fibrous material by drawing from a tank and dehydrating an aqueous slurry by means of a suction cylinder on which an endless permeable web is wound.

Said apparatus may find several applications, such as for instance in the manufacture of paper, paperboard and asbestos-cement articles. In the latter instance the elementary layer, being conveniently dehydrated, is wound on a metallic mandrel until the desired thickness is reached.

Among most usual methods of manufacturing the elementary layer the following are mentioned.

The aqueous slurry is contained in a vat wherein a rotating wire net cylinder is dipped, by means of which most of the water is eliminated. Thus, a thin sheet is formed which is transferred due to adhesion to an endless felt web travelling in contact with the wire net cylinder, conveying thereby the formed sheet to the next operative step. This method is inconvenient in that a large amount of the material forming the slurry penetrates through the wire net, thereby requiring complicated and expensive recovery steps. This disadvantage is particularly appreciable in the manufacture of asbestos-cement articles, where the use of expensive mixtures having a high content of fibrous substance becomes necessary. Moreover, it should be noted that the amount of cement penetrating through the wire net, though it is recovered, deteriorates because of the prolonged immersion in water.

Another method, particularly known in the paper industry, consists in supplying to a container the slurry in a highly diluted state. The rotating suction cylinder is partially dipped therein. The cylinder is formed with a perforated surface provided with a large number of small diameter perforations. An endless permeable web is driven on the cylinder and moves therewith. An endless sheet is formed by the combined action due to motion of the cylinder and suction from the interior thereof, while water is eliminated by the suction. Normally, the cylinder has a stationary tray provided therein, defining the suction zone.

The above mentioned suction cylinder methods cannot be used when treating cementitious materials, as in the case of asbestos-cement, since the surface perforations, which are necessarily of small diameter, would rapidly clog, prejudicing and finally annulling the suction action; cleaning of the large number of said perforations would be too expensive. Moreover, in this case the provision in the suction cylinder of means defining the operative zone thereof would be too difficult and expensive when sheets of several meters in length are to be manufactured.

The object of this invention is to provide an apparatus wherein the suction roller exerts an effective suction, easy cleaning thereof being possible after the operation, while sheets of large sizes can be manufactured.

The principal feature of the apparatus according to this invention consists in that the surface of the suction roller is provided with ribs forming channels which are externally defined by the web and communicate with the suction source through outlet ports of the cylinder.

According to an embodiment of this invention the cylinder rotates on a tubular stationary support wherein suction is applied, slits being cut in the support corresponding to the outlet ports of the cylinder.

Other characteristics of this apparatus will become apparent from the following description, reference being made to the annexed drawings showing by way of example only a practical embodiment of the invention.

Figure 1:
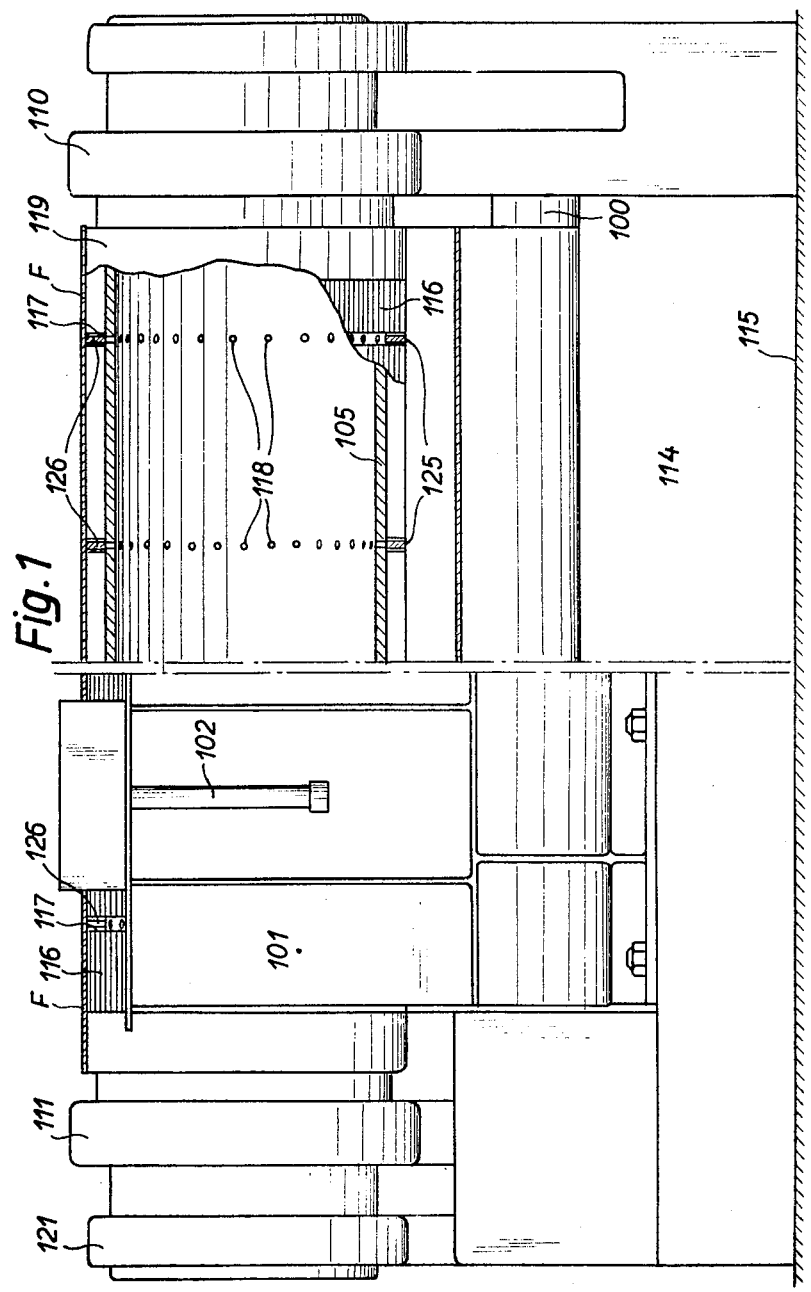
Fig. 1 is an elevational view, partially sectional, of the invention.
Figure 2:
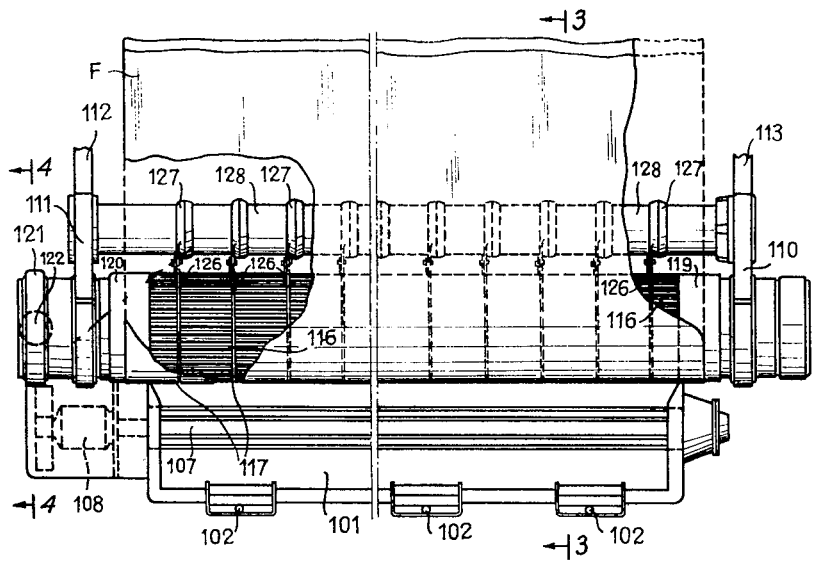
Figure 2 is a plan view, partially sectional, of Fig. 1.
Figure 3:
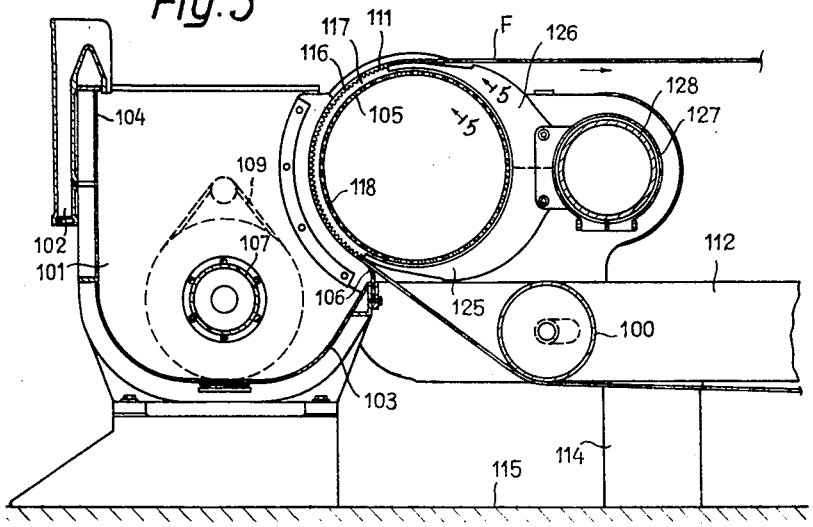
Figure 3 is a sectional view on line 3—3 of Figure 2.

Referring to Figs. 1 through 3 the apparatus comprises a tank 101 containing an aqueous slurry (not shown) supplied continuously thereto through tubes 102.

The rear wall 103 (Fig. 3) of the tank is lower than the front wall 104, and is integrated with a portion of the outer periphery of the suction cylinder generally indicated at 105 (Fig. 3). A felt web F passes on the cylinder 105, on the side towards the tank 101. At the upper edge of the wall 103 and on the lateral end walls of the tank packings 106 of resilient material, for instance rubber, are attached, for forming a seal between the walls of the tank 101 and the web F.

Within the tank 101 a stirrer 107 (Figs. 2 and 3) parallel with the axis of the suction roller 105 is provided, the stirrer being rotated by a motor 108, the drive being transmitted through a belt and pulleys transmission 109.

The suction roller 105 is rotatably mounted on two end supports 110 and 111, respectively, fixedly connected with longitudinal girders 112 and 113, respectively of the machine frame (Figure 2).

Each of the longitudinal girders 112 and 113 is supported by brackets 114 (Fig. 3) directly anchored to the foundation of the apparatus incorporated within the floor 115 where the apparatus is located.

Transmission rollers 100 of the web F are mounted on the frame members and supports 110 and 111.

The suction roller 105, being the principal member of the apparatus, is of hollow shape and its ends penetrate through the lateral supports 110 and 111 and are laterally closed so as not to communicate with the outside.

The operative surface of the suction roller 105 at the portion between the supports 110 and 111 is provided with longitudinal ribs 116 transversely interrupted by annular grooves 117 on the bottom of which ports 118 of suitable size and shape are formed.

As can be seen from Figure 2, the sections 119 and 120, respectively of the cylinder 105 adjacent to the supports 110 and 111, are not provided with ribs. Their function is to laterally close the channels formed between the ribs 116, guiding the lateral non operative edges of the felt web passing on the suction roller.

Figure 4:
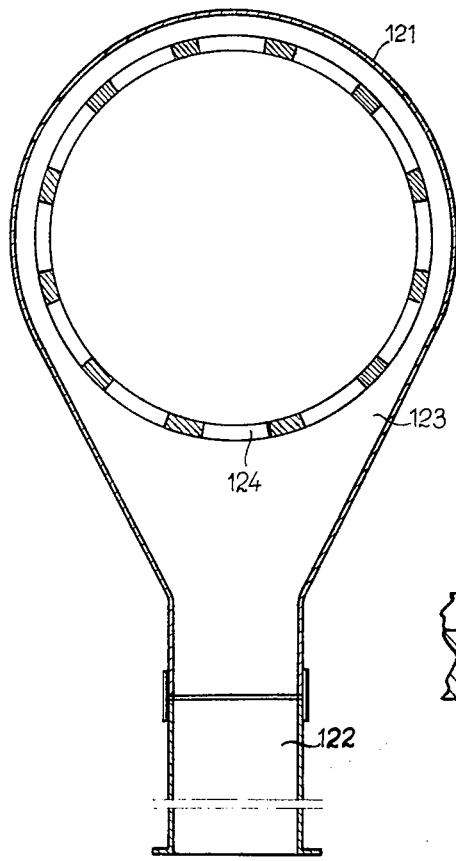
Figure 4 is a sectional view on line 4—4 of Figure 2.

The inside of the cylinder 105 communicates with a suction source through a stationary manifold 121 (Figs. 1, 2 and 4) placed externally of the support 111. The manifold 121 is internally of a hollow shape and communicates with a water and air suction vertical tube 122 (Figs. 2 and 4).

The inside of the cylinder 105 and the inner chamber 123 of the manifold 121 may be connected by cutting a plurality of radial apertures 124 (Fig. 4) in the portion of the periphery of the cylinder 105 passing through the manifold 121, so as to provide communication between the inside of the cylinder 105 and the tube 122, For restricting the suction applied from the interior of the cylinder 105 to the zone only where the suction cylinder draws and partially dehydrates the aqueous suspension in the tank 101, means are provided for cutting off communication of the perforations 118 with the outside at the zones corresponding to the inoperative portion of the cylinder during movement thereof, the latter portion being substantially that on the side opposed to the tank.

Said means comprise sectors 125 and 126 a pair of which are fork-shaped in combination and have a circular inner profile corresponding to the outer profile of the cylinder 105 (Fig. 3). A pair of sectors 125, 126 engage each of the annular grooves 117.

Said sectors 125 and 126 are mounted on adjustable sleeves 127 (Fig. 2) by means of a tubular longitudinal support 128 placed adjacent to the suction roller 105 on the side opposed to the tank 101 and rigidly supported by the lateral supports 110 and 111.

Figure 5:
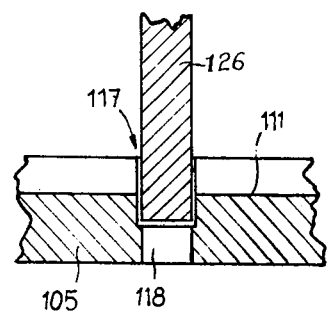
Figure 5 is a sectional view on line 5—5 of Figure 3, shown on an enlarged scale.

Since each sector 125, 126 is of a width such as to substantially fill the whole groove 117 (Fig. 5), suction through the radial holes 118 of the skirt of the cylinder 105 takes place exclusively in the portion where the suction cylinder draws the material from the tank 101 and the subsequent zone which, in the example shown, terminates a short distance before the material carried by the felt web F passes the top of the suction cylinder.

Figure 6:
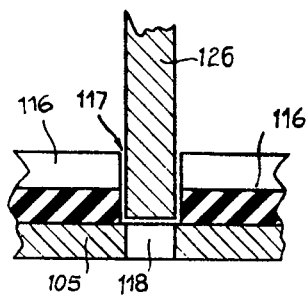
Figure 6 is a sectional view similar to that of Figure 5, but concerning a further embodiment of the invention.

According to a special embodiment of the invention, the ribs 116 and a section of the thickness of the suction cylinder are of rubber (Figure 6) this allowing a more convenient periodical cleaning of the cylinder and a more effective seal between the elements 125, 126 and the inner walls of the grooves 117.

Of course, the invention is not limited to the exact details shown and described by way of example only.

What I claim is:

1. In an apparatus for manufacturing a sheet of fibrous material by drawing and dehydrating an aqueous slurry from a vat by means of a suction cylinder on which a permeable endless web is wound, the said suction cylinder of a hollow structure having longitudinally extending ribs on its outer circumferential surface defining longitudinal channels between the ribs, suction ports opening into said channels, a circumferential annular groove transverse to said longitudinal channels on the cylinder and said suction ports being arranged on the bottom of said annular groove, at least a pair of members, fork-shaped in combination and positioned externally of the cylinder out of the region of engagement of the cylinder with the web, said pair of fork-shaped members engaging in said annular groove to close the suction ports which do not face the said region of cylinder and web engagement and to leave open the ports facing the said region.

2. In the apparatus as claimed in claim 1, the said fork-shaped pair of members removably and adjustably secured on a tubular support extending parallel with the cylinder.

3. In the apparatus as claimed in claim 1, the said cylinder comprising a rubber skirt, and the said ribs and channels being formed in the skirt.

References Cited in the file of this patent

UNITED STATES PATENTS

| | | |
|---|---|---|
| 1,913,678 | Kutter | June 13, 1933 |
| 2,108,116 | Furminger | Feb. 15, 1938 |
| 2,329,553 | Newbould | Sept. 14, 1943 |

FOREIGN PATENTS

| | | |
|---|---|---|
| 594,797 | France | Sept. 18, 1925 |
| 701,689 | Great Britain | Dec. 30, 1953 |